(12) United States Patent
Davila et al.

(10) Patent No.: US 6,496,396 B2
(45) Date of Patent: Dec. 17, 2002

(54) REVERSE RECOVERY CIRCUIT, METHOD OF OPERATION THEREOF AND ASYMMETRICAL HALF-BRIDGE POWER CONVERTER

(75) Inventors: Marco A. Davila, Mesquite, TX (US); Rui Liu, Fremont, CA (US)

(73) Assignee: Tyco Electronics Logistics AG, Steinach (CH)

( * ) Notice: Subject to any disclaimer, the term of this patent is extended or adjusted under 35 U.S.C. 154(b) by 0 days.

(21) Appl. No.: 09/780,187

(22) Filed: Feb. 9, 2001

(65) Prior Publication Data

US 2002/0110010 A1 Aug. 15, 2002

(51) Int. Cl.[7] .................................................. H02M 3/24
(52) U.S. Cl. .......................................... 363/98; 363/17
(58) Field of Search .............................. 363/98, 97, 16, 363/17, 56, 132, 25

(56) References Cited

U.S. PATENT DOCUMENTS

| 4,158,881 | A | * | 6/1979 | Simmons et al. | 363/97 |
| 4,263,642 | A | * | 4/1981 | Simmons et al. | 363/17 |
| 4,275,588 | A | * | 6/1981 | McLyman et al. | 363/56 |
| 4,679,129 | A | * | 7/1987 | Sakakibara et al. | 363/17 |
| 4,691,273 | A | * | 9/1987 | Kuwata et al. | 363/132 |
| 4,802,078 | A | * | 1/1989 | Hill | 363/56 |
| 5,198,969 | A | | 3/1993 | Redl et al. | |
| 5,402,329 | A | | 3/1995 | Wittenbreder, Jr. | |
| 5,668,703 | A | * | 9/1997 | Rossi et al. | 363/16 |
| 6,239,993 | B1 | | 5/2001 | Fraidlin et al. | |

* cited by examiner

Primary Examiner—Rajnikant B. Patel

(57) ABSTRACT

For use with an asymmetrical half-bridge power converter having a primary switching circuit coupled to a primary winding of a transformer and a rectifier coupled to a secondary winding of the transformer, a reverse recovery circuit a method of operation thereof. In one embodiment, the reverse recovery circuit includes an inductor that reduces current spikes in the primary switching circuit caused by a reverse recovery phenomenon associated with the rectifier. The reverse recovery circuit also includes a diode, coupled to the inductor, that clamps a voltage across the rectifier.

21 Claims, 3 Drawing Sheets

REVERSE RECOVERY CIRCUIT, METHOD OF OPERATION THEREOF AND ASYMMETRICAL HALF-BRIDGE POWER CONVERTER

CROSS-REFERENCE TO RELATED APPLICATION

This application is related to U.S. patent application Ser. No. 09/602,416, entitled "Circuit for Reducing Losses Associated with a Power Converter and Method of Operation Thereof," by Simon Fraidlin, et al., filed on Jun. 23, 2000, which is incorporated herein by reference.

TECHNICAL FIELD OF THE INVENTION

The present invention is directed, in general, to power conversion and, more specifically, to a circuit for reducing losses associated with a power converter, a method of operating the circuit and a power converter employing the circuit or the method.

BACKGROUND OF THE INVENTION

The development of high-efficiency power supplies in combination with a requirement of higher power density is a continuing goal in the field of power electronics. A switched-mode power converter is a frequently employed component of a power supply that converts an input voltage waveform into a specified output voltage waveform. There are several types of switched-mode power converters including an asymmetrical half-bridge power converter.

A conventional asymmetrical half-bridge power converter includes two power switches coupled to a controller, at least one isolation transformer, a voltage balancing capacitor, a rectifier and a filter. The asymmetrical half-bridge power converter generally operates as follows. The first and second power switches conduct current in a complimentary manner, with generally unequal duty cycles, to convert an input DC voltage into an AC voltage to be applied across the isolation transformer. Any DC component of the voltage applied to a primary winding of the isolation transformer is blocked by the voltage balancing capacitor coupled in series with the primary winding of the isolation transformer. The rectifier then rectifies a secondary voltage from the isolation transformer and the filter smooths and filters the rectified voltage to develop an output voltage for delivery to a load. The controller monitors the output voltage of the asymmetrical half-bridge power converter and adjusts the duty cycle of the power switches to ultimately control the output voltage. The output voltage may be maintained at a relatively constant level despite relative fluctuations in the input voltage and the load.

The asymmetrical half-bridge power converter is a well known power circuit topology that may be capable of zero voltage switching (ZVS) operation. A high magnetizing current, usually exceeding twice the load current, however, may be required to attain ZVS operation. In U.S. Pat. No. 5,402,329, entitled, "Zero Voltage Switching Pulse Width Modulated Power Converters," which is incorporated herein by reference, Wittenbreder suggests placing an inductor in series with the primary winding of the isolation transformer. One of the ZVS transitions is driven by a combination of the magnetic energy stored in the transformer and the magnetizing energy stored in the inductor. The other ZVS transition is driven by energy stored in the inductor. While the series inductance may allow for ZVS operation with lower magnetizing currents, the inductor may cause spurious voltage spikes across the rectifier during reverse recovery.

Further, one or more of the power switches may be subject to current spikes induced therein by the reverse recovery of the rectifier. Saturable reactors may be used in the secondary circuit to reduce current spiking. However, saturable reactors tend to be larger in size than desired and contribute an appreciable cost factor to the power converter.

Accordingly, what is needed in the art is a circuit that reduces spurious spikes in a power converter that overcomes the deficiencies in the prior art.

SUMMARY OF THE INVENTION

To address the above-discussed deficiencies of the prior art, the present invention provides, for use with an asymmetrical half-bridge power converter having a primary switching circuit coupled to a primary winding of a transformer and a rectifier coupled to a secondary winding of the transformer, a reverse recovery circuit a method of operation thereof. In one embodiment, the reverse recovery circuit includes an inductor that reduces current spikes in the primary switching circuit caused by a reverse recovery phenomenon associated with the rectifier. The reverse recovery circuit also includes a diode, coupled to the inductor, that clamps a voltage across the rectifier.

The present invention introduces, in one aspect, a circuit capable of reducing current spikes in the primary switching circuit of a power converter. Additionally, voltage spiking across the rectifier associated with a reverse recovery phenomenon is positively affected. Advantageously, recovering transient energy associated with the reverse recovery phenomenon enhances an energy transfer to a load of the power converter and therefore improves the overall efficiency of the power converter.

In one embodiment of the present invention, the reverse recovery circuit includes an auxiliary winding, coupled to the inductor, that transfers a portion of energy in the inductor to the secondary winding. In a related embodiment, the inductor and the auxiliary winding are series-coupled to the primary winding. These arrangements allow an effective recovery of a portion of the energy in the power converter. In another related embodiment, the diode of the reverse recovery circuit is coupled to a node between the auxiliary winding and the primary winding. In yet another related embodiment, the reverse recovery circuit further includes a second diode coupled to the node. Of course, other circuit configurations may be possible and are well within the scope of the present invention.

In one embodiment of the present invention, the power converter further includes a controller that controls conduction intervals of a power switch of the power switching circuit. In a related embodiment, the controller monitors an output voltage of the power converter and to operate the power switch in response thereto. The output voltage of the power converter may thus be regulated despite variations in the input voltage or the load. Of course, the controller may monitor other characteristics associated with the power converter as desired and control the power switch as a function thereof.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
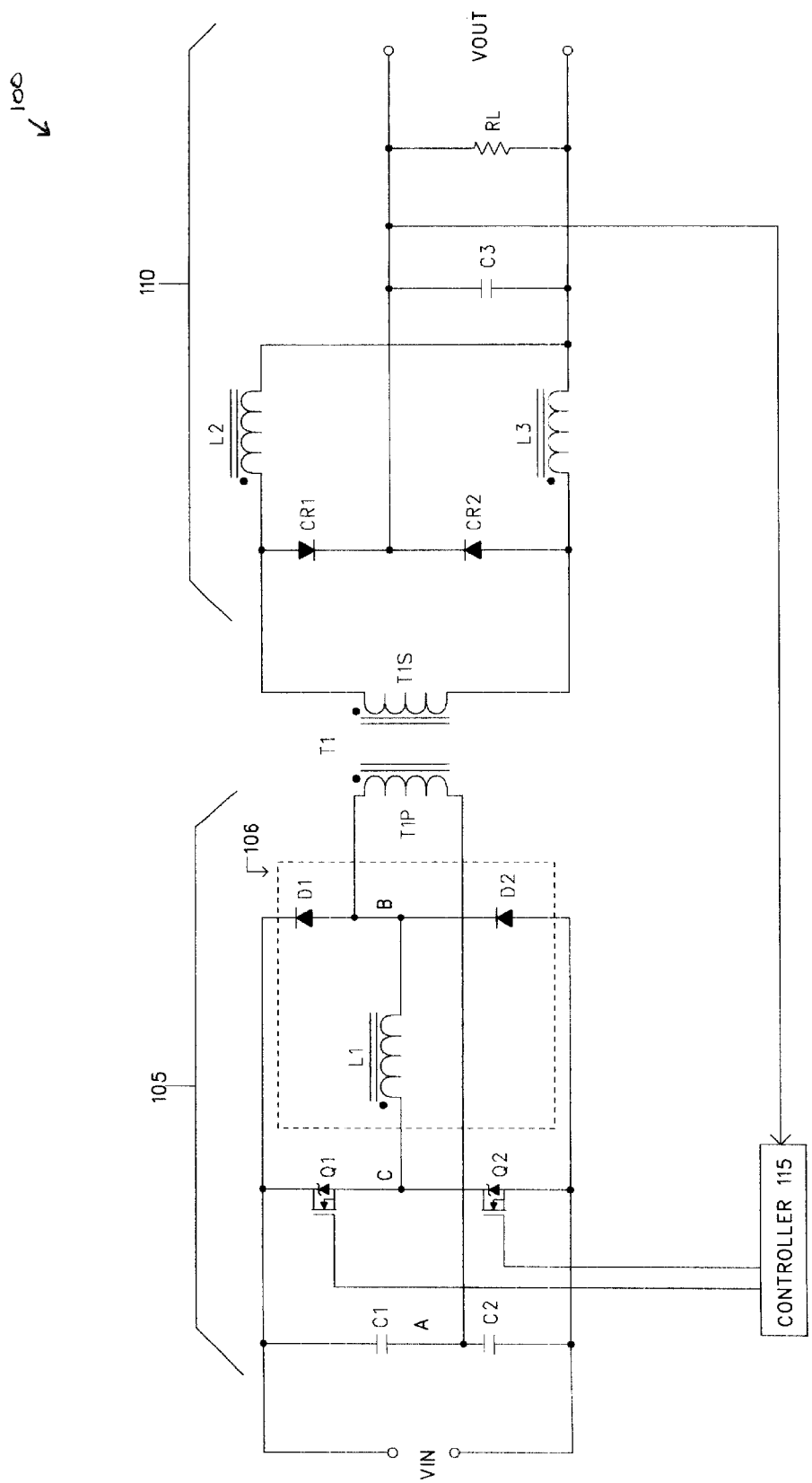
FIG. 1 illustrates a schematic diagram of an embodiment of an asymmetrical half-bridge power converter constructed in accordance with the principles of the present invention.

Referring initially to FIG. 1, illustrated is a schematic diagram of an asymmetrical half-bridge power converter 100 constructed in accordance with the principles of the present invention. The power converter 100 has an input couplable to a source of electrical power supplying an input voltage Vin. The power converter 100 provides an output voltage Vout to a load employing a load resistor $R_L$. The power converter 100 includes a primary switching circuit 105 and a secondary rectifying circuit (or rectifier) 110, which are coupled through an isolation transformer T1 having a primary winding T1p and a secondary winding T1s. The power converter 100 further includes a controller 115.

The primary switching circuit 105 employs a half-bridge topology, which includes first and second power switches Q1, Q2 that are series-coupled across the input of the power converter 100. The primary switching circuit 105 further includes first and second capacitors C1, C2 and a reverse recovery circuit 106. The reverse recovery circuit 106 includes an inductor L1 and first and second diodes D1, D2 that are coupled to the inductor L1 and series-coupled across the first and second power switches Q1, Q2. The inductor L1 is configured to reduce current spikes in the primary switching circuit 105 caused by a reverse recovery phenomenon associated with the secondary rectifying circuit 110. The first and second diodes D1, D2 are configured to clamp a voltage across first and second rectifiers CR1, CR2 included in the secondary rectifying circuit 110. The secondary rectifying circuit 110 further includes first and second filter inductors L2, L3 and a filter capacitor C3 coupled to the load resistor $R_L$.

The primary winding T1p is coupled between a first node A intermediate the first and second capacitors C1, C2 and a second node B intermediate the first and second diodes D1, D2. Additionally, the inductor L1 is coupled between the second node B and a third node C intermediate the first and second power switches Q1, Q2.

The controller 115 monitors the output voltage Vout and adjusts relative duty cycles of the first and second power switches Q1, Q2 to regulate the output voltage Vout despite fluctuations in the input voltage Vin or the load resistor $R_L$. Of course, the controller 115 may monitor other characteristics associated with the power converter 100 as desired. In the illustrated embodiment, the first and second power switches Q1, Q2 are metal oxide semiconductor field-effect transistors (MOSFETs). Of course, other types of switches, including bipolar junction transistors (BJTs), are well within the broad scope of the present invention.

While the power converter 100 may be capable of zero voltage switching (ZVS) operation, a high load current may be required. Further, the first and second power switches Q1, Q2 may be subject to current spikes induced therein by the reverse recovery of the first and second rectifiers CR1, CR2. The power converter 100, therefore, uses the inductor L1 to reduce such current spiking and to allow for ZVS operation with lower load currents.

The power converter 100 operates as follows. The first and second power switches Q1, Q2 conduct current in a complimentary manner, with generally unequal duty cycles, to convert the input voltage Vin into an AC voltage to be applied across the primary winding T1p of the isolation transformer T1. The first and second rectifiers CR1, CR2 then rectify a secondary voltage from the secondary winding T1s wherein the rectified voltage is smoothed and filtered by the first and second filter inductors L2, L3 and the filter capacitor C3 to develop the output voltage Vout.

Assume initially that the first power switch Q1 has been conducting and current in the primary switching circuit 105 circulates through the first power switch Q1, the inductor L1, the primary winding T1p and the second capacitor C2. The first filter inductor L2 is freewheeling and the second filter inductor L3 is being energized. The first power switch Q1 is then turned OFF (becomes non-conducting), and the second power switch Q2 becomes conducting (after the ZVS transition) causing the voltage polarity across the secondary winding T1s to reverse. This causes the second rectifier CR2 to conduct, and the first rectifier CR1 to be in a reverse recovery mode. This condition thereby places a temporarily shorted condition across the secondary winding T1s, which is reflected into the primary winding T1p.

This action places the inductor L1 in series with the primary winding T1p so that it limits the amount of current increase through the second power switch Q2. Subsequently, as this current accumulates, a point is reached where the current in the secondary winding T1s reaches the level of the current in the first filter inductor L2. At this point, current begins flowing into the cathode of the first rectifier CR1, which begins the reverse recovery process. When the reverse recovery process in the first rectifier CR1 is complete, the current through the inductor L1 is greater than the reflected current in the first filter inductor L2.

Subsequently, the primary winding T1p becomes a constant current source and the extra current freewheels and slowly dissipates in the conducting power switch (e.g., the second power switch Q2). The conducting power switch thereby performs like a resistive/inductive snubber dissipating energy in the ON-resistance of the conducting power switch and a forward voltage drop of the conducting diode (e.g., the second diode D2). The larger the value of inductance of the inductor L1, the less energy is absorbed thereby requiring more time for reverse recovery of the first and second rectifiers CR1, CR2. This action is symmetrical when the first and second power switches Q1, Q2 reverse their conducting and non-conducting modes.

Figure 2:
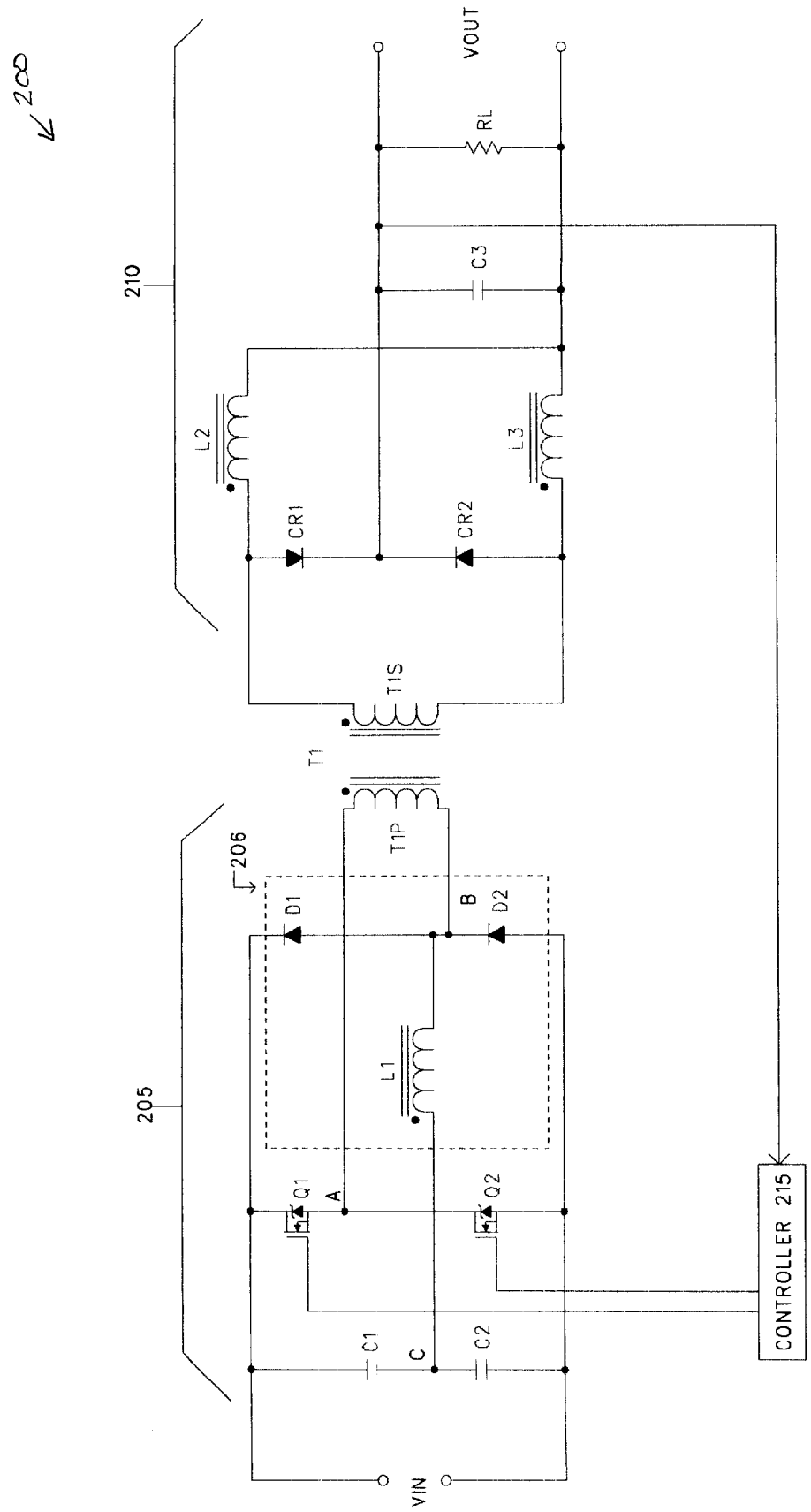
FIG. 2 illustrates a schematic diagram of another embodiment of an asymmetrical half-bridge power converter constructed in accordance with the principles of the present invention.

Turning now to FIG. 2, illustrated is a schematic diagram of another embodiment of an asymmetrical half-bridge power converter 200 constructed in accordance with the principles of the present invention. The power converter 200 has an input couplable to a source of electrical power supplying an input voltage Vin. The power converter 200 provides an output voltage Vout to a load employing a load resistor $R_L$. The power converter 200 includes a primary switching circuit 205 and a secondary rectifying circuit (or rectifier) 210, which are coupled through an isolation transformer T1 having a primary winding T1p and a secondary winding T1s. The power converter 200 further includes a controller 215.

The primary switching circuit 205 employs a half-bridge topology, which includes first and second power switches Q1, Q2 that are series-coupled across the input of the power converter 200. The primary switching circuit 205 further includes first and second capacitors C1, C2 and a reverse recovery circuit 206. The reverse recovery circuit 206 includes an inductor L1 and first and second diodes D1, D2 that are coupled to the inductor L1 and series-coupled across the first and second power switches Q1, Q2. The inductor L1 is configured to reduce current spikes in the primary switching circuit 205 caused by a reverse recovery phenomenon associated with the secondary rectifying circuit 210. The first and second diodes D1, D2 are configured to clamp a voltage across first and second rectifiers CR1, CR2 included in the secondary rectifying circuit 210. The secondary rectifying circuit 210 further includes first and second filter inductors L2, L3 and a filter capacitor C3 coupled to the load resistor $R_L$.

In the illustrated embodiment, the primary winding T1p is coupled between a first node A intermediate the first and second power switches Q1, Q2 and a second node B intermediate the first and second diodes D1, D2. Additionally, the inductor L1 is coupled between the second node B and a third node C intermediate first and second capacitors C1, C2. This arrangement couples the inductor L1 to the other side of the primary winding T1p as compared to the power converter illustrated and described with respect to FIG. 1.

The controller 215 monitors the output voltage Vout and adjusts relative duty cycles of the first and second power switches Q1, Q2 to regulate the output voltage Vout despite fluctuations in the input voltage Vin or the load resistor $R_L$. Of course, the controller 215 may monitor other characteristics associated with the power converter 200 as desired. In the illustrated embodiment, the first and second power switches Q1, Q2 are metal oxide semiconductor field-effect transistors (MOSFETs), as before. Of course, other types of switches, including bipolar junction transistors (BJTs), are well within the broad scope of the present invention.

In the illustrated embodiment, the inductor L1 is still used to store energy during switching transients that occur when the first and second power switches Q1, Q2 are toggled between their respective conducting states. The operation of the power converter 200 is analogous to the operation of the power converter 100 of FIG. 1. The transients modulated by the reverse recovery circuit 206, however, may be recovered within the power converter 200.

The first and second rectifiers CR1, CR2 should be able to accommodate the transients (e.g., a large transient voltage appearing across the isolation transformer T1, which produces a large voltage spike on secondary winding T1s) without experiencing component damage. Therefore, recovering the switching energy suggests that the first and second rectifiers CR1, CR2 associated with the power converter 200 have about twice the reverse breakdown voltage capability in comparison to the first and second rectifiers CR1, CR2 associated with power converter 100 of FIG. 1. The overall efficiency of the power converter 200 may be improved by recovering the energy.

Figure 3:
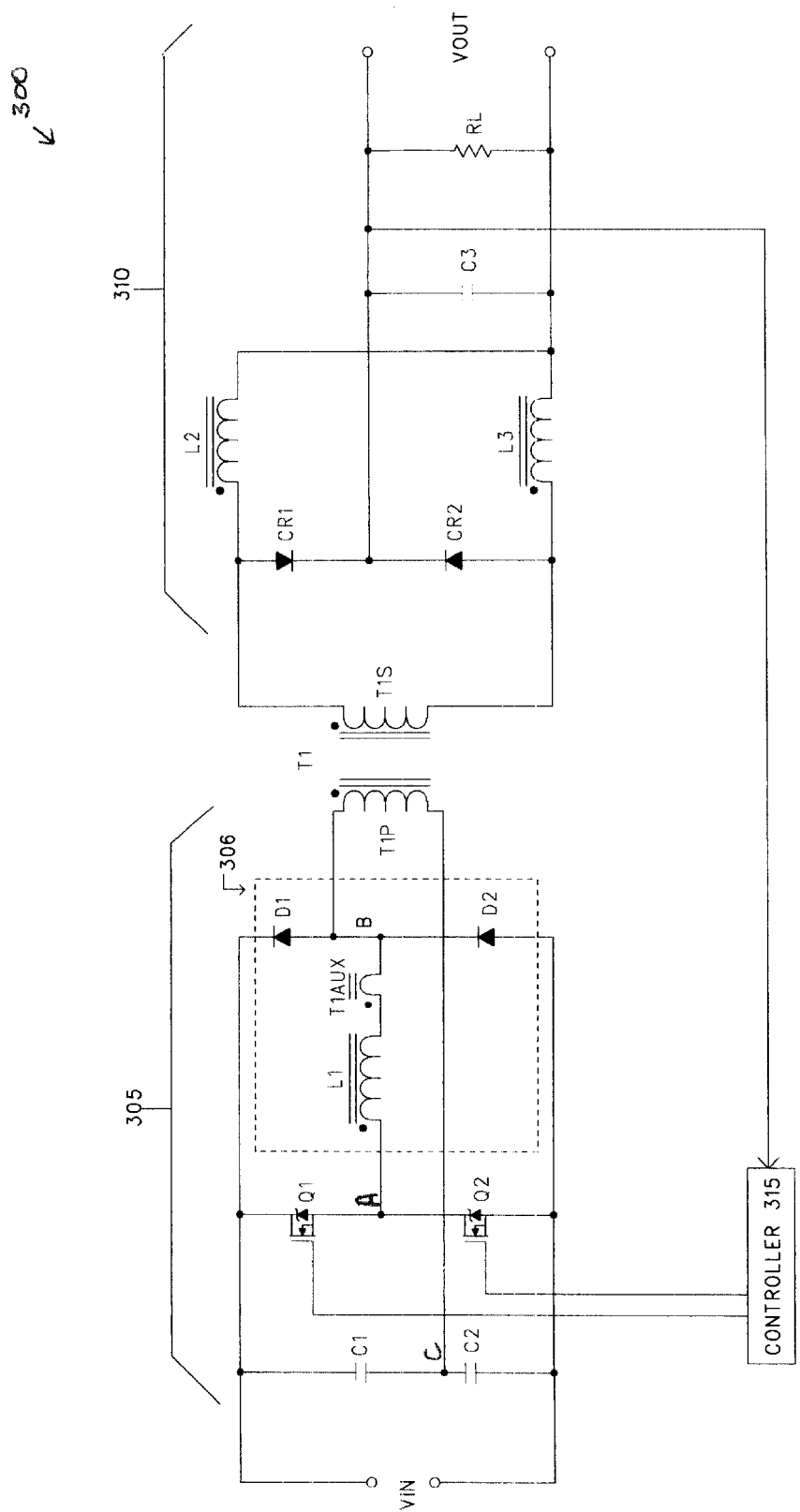
FIG. 3, illustrates a schematic diagram of yet another embodiment of an asymmetrical half-bridge power converter constructed in accordance with the principles of the present invention.

Turning now to FIG. 3, illustrated is a schematic diagram of another embodiment of an asymmetrical half-bridge power converter 300 employing an auxiliary winding T1aux associated with an isolation transformer T1. The power converter 300 also has an input couplable to a source of electrical power supplying an input voltage Vin. The power converter 300 provides an output voltage Vout to a load employing a load resistor $R_L$.

Analogous to the power converters previously described, the power converter 300 includes a primary switching circuit 305 and a secondary rectifying circuit (or rectifier) 310, which are coupled through the isolation transformer T1. However, the isolation transformer T1 includes a primary winding T1p, a secondary winding T1s and the auxiliary winding T1aux coupled to the primary winding T1p. The power converter 300 further includes a controller 315.

The primary switching circuit 305 also employs a half-bridge topology, which includes first and second power switches Q1, Q2 that are series-coupled across the input of the power converter 300. The primary switching circuit 305 further includes first and second capacitors C1, C2 and a reverse recovery circuit 306. The reverse recovery circuit 306 includes an inductor L1 coupled to the auxiliary winding T1aux and first and second diodes D1, D2 that are coupled to the inductor L1 and series-coupled across the first and second power switches Q1, Q2. The inductor L1 and the auxiliary winding T1aux cooperate to reduce current spikes in the primary switching circuit 305 and transfer a portion of the energy in the inductor L1 to the secondary winding T1s and, ultimately, an output of the power converter 300.

The secondary rectifying circuit 310 includes first and second rectifiers CR1, CR2 coupled to the secondary winding T1s. The secondary rectifying circuit 310 further includes first and second filter inductors L2, L3 and a filter capacitor C3 coupled to the load resistor $R_L$. The first and second diodes D1, D2 are configured to clamp a voltage across the first and second rectifiers CR1, CR2.

The controller 315 monitors the output voltage Vout and adjusts relative duty cycles of the first and second power switches Q1, Q2 to regulate the output voltage Vout despite fluctuations in the input voltage Vin or the load resistor $R_L$. Of course, the controller 315 may monitor other characteristics associated with the power converter 200 as desired.

In the illustrated embodiment, the primary winding T1p is coupled between a first node A intermediate the first and second capacitors C1, C2 and a second node B intermediate the first and second diodes D1, D2. The series-coupled auxiliary winding T1aux and the inductor L1 are coupled between the second node B and a third node C intermediate the first and second power switches Q1, Q2. This series-coupled arrangement of the auxiliary winding T1aux and the inductor L1 in the power converter 300 allows improved transient energy management. Part of the transient energy is dissipated in the conducting first or second power switch Q1, Q2 just subsequent to a transition time. However, another portion of the energy is transferred to the secondary winding T1s through the auxiliary winding T1aux. In this manner, a portion of the transient energy may be recycled for transfer to the load resistor $R_L$.

The inductor L1 stores energy while the isolation transformer T1 is experiencing a shorted condition, as before. As this shorted condition terminates, that is, the reverse recovery mode of the first or second rectifier CR1, CR2 terminates, the voltage across the isolation transformer T1 increases and is actually larger than usual. For the purpose of analysis and discussion, assume a case where there is not an inductor, and the input voltage Vin is 400 DC volts. Thus, 200 volts is applied across the now series-coupled primary winding T1p and the auxiliary winding T1aux.

If the auxiliary winding T1aux has one turn and the primary winding T1p has nine turns, 20 volts appears across the auxiliary winding T1aux and 180 volts appears across the primary winding T1p, respectively. For an overall turns ratio of unity for the isolation transformer T1, 200 volts appears across the secondary winding T1s. If a current in the secondary winding T1s is 10 amperes, this dictates a current of 10 amperes in the primary winding T1p as well.

For the case where the inductor L1 is included, the current through the inductor L1 will be greater than 10 amperes since it has been accumulating energy. A current of 15 amperes through the inductor L1 allows a current balance to be made for the isolation transformer T1. The auxiliary winding T1aux has one turn with 15 amperes through it giving 15 ampere-turns. The secondary winding T1s has 10 turns with 10 amperes, which is 100 ampere-turns. So, 85 ampere-turns is supplied by the primary winding T1p, which has 9 turns. This gives a current of about 9.44 amperes to meet the needs of the secondary rectifying circuit 310.

However, the primary winding T1p has 200 volts impressed across its nine turns yielding about 22 volts per turn. So the series-coupled auxiliary and primary windings T1aux, T1p are producing 222 volts instead of 200 volts. Therefore, more energy in the form of a higher secondary voltage is being delivered to the secondary rectifying circuit 310 due to the presence of the auxiliary winding T1aux. This action allows the stored energy in the inductor L1 to dissipate more quickly, and the energy dissipated in the first or second power switches Q1, Q2 to be reduced.

In summary, the present invention introduces, in one aspect, embodiments of a circuit capable of reducing current spikes in the primary switching circuit of a power converter. Additionally, voltage spiking across the secondary rectifier circuits associated with a reverse recovery phenomenon is positively affected. Advantageously, recovering transient energy associated with the reverse recovery phenomenon enhances an energy transfer to a load of the power converter and therefore improves an efficiency of the power converter.

Those skilled in the art should understand that the previously described embodiments of the a circuit for reducing losses associated with a power converter, the related method and the power converter are submitted for illustrative purposes only and other embodiments capable of reducing current spikes in a primary switching circuit of the power converter, effecting substantially zero voltage switching of a power switch of the primary switching circuit and clamping a voltage across a rectifier of the power converter are well within the scope of the present invention.

Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. Further, while the principles of the present invention have been illustrated in the environment of an asymmetrical half-bridge power converter, other power converter topologies may advantageously employ the principles of the present invention and remain well within the scope of the present invention.

For a better understanding of power converters, see Modern DC-to-DC Switchmode Power Converter Circuits, by Rudolph P. Severns and Gordon Bloom, Van Nostrand Reinhold Company, New York, N.Y. (1985); and Principles of Power Electronics, by John G. Kassakian, Martin F. Schlect and George C. Verghese, Addison-Wesley Publishing Company, Reading, Mass. (1991). The above-listed references are incorporated herein by reference in their entirety.

What is claimed is:

1. For use with an asymmetrical half-bridge power converter having a primary switching circuit coupled to a primary winding of a transformer and a rectifier coupled to a secondary winding of said transformer, a reverse recovery circuit, comprising:
    an inductor configured to reduce current spikes in said primary switching circuit caused by a reverse recovery phenomenon associated with said rectifier; and
    a diode, coupled to said inductor, configured to clamp a voltage across said rectifier.

2. The circuit as recited in claim 1 further comprising an auxiliary winding, coupled to said inductor, configured to transfer a portion of energy in said inductor to said secondary winding.

3. The circuit as recited in claim 2 wherein said inductor and said auxiliary winding are series-coupled to said primary winding.

4. The circuit as recited in claim 2 wherein said diode is coupled to a node between said auxiliary winding and said primary winding.

5. The circuit as recited in claim 4 further comprising a second diode coupled to said node.

6. The circuit as recited in claim 1 wherein said power converter further comprises a controller configured to control conduction intervals of a power switch of said primary switching circuit.

7. The circuit as recited in claim 6 wherein said controller is configured to monitor an output voltage of said power converter and to operate said power switch in response thereto.

8. For use with an asymmetrical half-bridge power converter having a primary switching circuit coupled to a primary winding of a transformer and a rectifier coupled to a secondary winding of said transformer, a method for reducing losses associated with said power converter, comprising:
    employing an inductor to reduce current spikes in said primary switching circuit caused by a reverse recovery phenomenon associated with said rectifier; and
    employing a diode, coupled to said inductor, to clamp a voltage across said rectifier.

9. The method as recited in claim 8 further comprising employing an auxiliary winding, coupled to said inductor, to transfer a portion of energy in said inductor to said secondary winding.

10. The method as recited in claim 9 wherein said inductor and said auxiliary winding are series-coupled to said primary winding.

11. The method as recited in claim 9 wherein said diode is coupled to a node between said auxiliary winding and said primary winding.

12. The method as recited in claim 11 further comprising a second diode coupled to said node.

13. The method as recited in claim 8 further comprising controlling conduction intervals of a power switch of said primary switching circuit.

14. The method as recited in claim 13 wherein said controlling comprises monitoring an output voltage of said power converter and to operating said power switch in response thereto.

15. An asymmetrical half-bridge power converter, comprising:
- a transformer having a primary winding and a secondary winding;
- a power switching circuit coupled to said primary winding;
- a rectifier coupled to said secondary winding; and
- a reverse recovery circuit, including:
    - an inductor that reduces current spikes in said primary switching circuit caused by a reverse recovery phenomenon associated with said rectifier, and
    - a diode, coupled to said inductor, that clamps a voltage across said rectifier.

16. The power converter as recited in claim 15 wherein said reverse recovery circuit further comprises an auxiliary winding, coupled to said inductor, that transfers a portion of energy in said inductor to said secondary winding.

17. The power converter as recited in claim 16 wherein said inductor and said auxiliary winding are series-coupled to said primary winding.

18. The power converter as recited in claim 16 wherein said diode is coupled to a node between said auxiliary winding and said primary winding.

19. The power converter as recited in claim 18 wherein said reverse recovery circuit further comprises a second diode coupled to said node.

20. The power converter as recited in claim 15 further comprising a controller that controls conduction intervals of a power switch of said primary switching circuit.

21. The power converter as recited in claim 20 wherein said controller monitors an output voltage of said power converter and to operate said power switch in response thereto.

* * * * *